US006237888B1

(12) United States Patent
Coll

(10) Patent No.: US 6,237,888 B1

(45) Date of Patent: May 29, 2001

(54) ANTENNA MOUNTING SYSTEM

(75) Inventor: Gene Coll, Cranford, NJ (US)

(73) Assignee: Thomas & Betts International, Inc., Sparks, NV (US)

(*) Notice: Subject to any disclaimer, the term of this patent is extended or adjusted under 35 U.S.C. 154(b) by 0 days.

(21) Appl. No.: 09/138,564

(22) Filed: Aug. 24, 1998

(51) Int. Cl.[7] .................................................. A01K 97/10

(52) U.S. Cl. ........................ 248/539; 248/219.1; 248/540

(58) Field of Search .................................... 248/539, 237, 248/218.4, 219.3, 230.6, 231.71, 534, 541, 542, 219.1; 343/824, 825, 878, 880, 890, 891, 892

(56) References Cited

U.S. PATENT DOCUMENTS

| | | | | |
|---|---|---|---|---|
| 2,329,415 | * | 9/1943 | Osborne | 248/237 |
| 2,495,972 | * | 1/1950 | Johnson | 248/539 |
| 2,681,195 | * | 6/1954 | Bradt et al. | 248/539 |
| 2,690,318 | * | 9/1954 | Kusiv | 248/539 |
| 2,695,149 | | 11/1954 | Chabot | 248/43 |
| 3,094,303 | | 6/1963 | Belger | 248/40 |
| 3,247,516 | * | 4/1966 | Rohn et al. | 343/890 |
| 3,970,304 | * | 7/1976 | Ebstein et al. | 248/225.11 |
| 4,005,860 | * | 2/1977 | Ebstein et al. | 248/225.11 |
| 4,127,739 | * | 11/1978 | Farmer | 248/219.1 |
| 4,181,284 | | 1/1980 | Seppelfrich | 248/514 |
| 4,595,165 | | 6/1986 | Klingensmith et al. | 248/539 |
| 4,799,067 | * | 1/1989 | Tekip et al. | 343/890 |
| 4,922,264 | * | 5/1990 | Fitzgerald et al. | 343/878 |
| 5,067,586 | * | 11/1991 | Myers | 248/237 |
| 5,454,197 | * | 10/1995 | Horrigan | 248/237 |
| 5,566,916 | | 10/1996 | Bailey | 248/230.1 |
| 5,570,559 | * | 11/1996 | Lewis | 248/237 |
| 5,647,567 | | 7/1997 | Pugh, Jr. et al. | 248/237 |
| 5,920,291 | * | 7/1999 | Bosley | 343/892 |
| 5,926,151 | * | 7/1999 | Hagiwara et al. | 343/882 |

FOREIGN PATENT DOCUMENTS

| | | | | |
|---|---|---|---|---|
| 1094592 | * | 5/1955 | (FR) | 248/541 |
| 6581324 | * | 10/1951 | (GB) | 248/237 |

* cited by examiner

*Primary Examiner*—Ramon O. Ramirez
*Assistant Examiner*—Kimberly Wood
(74) *Attorney, Agent, or Firm*—Birch, Stewart, Kolasch & Birch, LLP

(57) ABSTRACT

An antenna mounting system for mounting an antenna mast to a building with a roof having a plurality of exposed rafters extending in spaced-apart parallel relationship, comprises a support member for holding the mast vertically at a predetermined distance from an edge of the roof; a torsion-resistant attachment member for attaching the support member to one of the rafters; and first and second mast stabilizing arms for maintaining the mast in a stable, generally vertical position so as to resist wind effects, the first mast stabilizing are being adapted for attachment to the one rafter by the attachment member, and the second mast stabilizing arm being adapted for attachment to an other rafter spaced from the one rafter. The first and second mast stabilizing arms cooperate with the support member to provide a structurally rigid antenna mounting system. The antenna mast mounted to rafters with such a system can withstand a wind load of up to about 100 mph.

14 Claims, 2 Drawing Sheets

ANTENNA MOUNTING SYSTEM

BACKGROUND OF THE INVENTION

The present invention pertains to improvements in the field of antenna mounting systems. More particularly, the invention relates to an improved antenna mounting system for mounting an antenna mast to the roof of a building.

Many antennas for receiving or transmitting electromagnetic radiations for communication purposes, or for home entertainment purposes, require an antenna mounting bracket near or on a building to support an antenna in a vertical or horizontal direction. The antenna is usually supported by a mast and bracket to keep the antenna clear of surrounding objects, and to hold the antenna in a fixed direction. Sometimes a means such as a rotor, is used to change the direction of the antenna in order to receive or transmit the electromagnetic radiations between more than two fixed points.

Antenna masts are generally mounted to the roof of a building and necessitate the use of nails, screws or other fasteners which penetrate the roof and cause damage thereto. Spanish tile roofs which are common to the South Western part of the United States are easily damaged. Wireless cable companies have experienced considerable liability expenses due to damaged tile roofs.

The antenna bracket for mounting antenna masts to the exterior wall of buildings, proposed in U.S. Pat. No. 4,181,284, suffers from the same drawbacks as discussed above. Such an antenna bracket comprises four adjustable length arms which are each rotatably connected at one end to a post having a circular butt plate. The antenna mast is mounted to the past and rests against the butt plate. Each adjustable length arm is rotatably connected at the other end to a fastening plate which is anchored to the sidewall of a building by means of screws or the like. These screws damage the vinyl or aluminum siding, causing water ingress.

SUMMARY OF THE INVENTION

It is therefore an object of the present invention to overcome the above drawbacks and to provide an improved antenna mounting system for mounting an antenna to the roof of a building without damaging same.

In accordance with the invention, there is provided an antenna mounting system for mounting an antenna mast to a building with a roof having a plurality of exposed rafters extending in spaced-apart parallel relationship. The antenna mounting system of the invention comprises support means for holding the mast vertically at a predetermined distance from an edge of the roof; torsion-resistant attachment means for attaching the support means to one of the rafters; and first and second mast stabilizing means for maintaining the mast in a stable, generally vertical position so as to resist wind effects, the first mast stabilizing means being adapted for attachment to the one rafter by the attachment means, and the second mast stabilizing means being adapted for attachment to an other rafter spaced from the one rafter. The first and second mast stabilizing means cooperate with the support means to provide a structurally rigid antenna mounting system.

Applicant has found quite unexpectedly that by mounting the antenna mast to the exposed rafters of a roof, neither the roof nor the sidewall of the building can be damaged. Thus, considerable liability expenses can be avoided.

According to a preferred embodiment, the support means comprises an elongated support member having first and second ends with first clamping means at the first end for holding the mast at a first predetermined location thereon.

According to another preferred embodiment of the invention, the attachment means comprises a planar attachment member, first releasable fastening means for releasably securing the attachment member to the one rafter so that the attachment member is disposed in a vertical plane and has a portion projecting downwardly from the one rafter, and second releasable fastening means for releasably securing the support member at the second end to the downwardly projecting portion of the attachment member so that the support member extends horizontally outward therefrom.

According to a further preferred embodiment of the invention the first stabilizing means comprises a first stabilizing arm having first and second ends with second clamping means at the first end for holding the mast at a second predetermined location thereon, the second location being sufficiently spaced from the first location to prevent pivotal movement of the mast, and third releasable fastening means for releasably securing the first stabilizing arm at the second end to the downwardly projecting portion of the attachment member so that the first stabilizing arm extends outward from the attachment member at a predetermined angle relative to the support member.

According to yet another preferred embodiment, the second stabilizing means comprises a second stabilizing arm having first and second ends with the first end being attached to the mast by the aforesaid second clamping means, and first releasable attachment means for releasably attaching the second stabilizing arm at the second end to the other rafter. Preferably, the second stabilizing means further include an additional stabilizing arm having first and second ends with the first end being attached to the mast by the aforesaid first clamping means, and second releasable attachment means for releasably attaching the additional stabilizing arm at the second end to the other rafter. The support member and the first stabilizing arm cooperate with a portion of the mast extending between the first and second locations to define a first rigid structure having a generally triangular configuration; the second stabilizing arm and the additional stabilizing arm, on the other hand, cooperate with such a mast portion to define a second rigid structure having a generally triangular configuration.

Antenna masts mounted to rafters with the antenna mounting system of the invention can withstand a wind load of up to about 100 mph.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further features and advantages of the invention will become more readily apparent from the following description of a preferred embodiment as illustrated by way of example in the accompanying drawings, in which.

DESCRIPTION OF PREFERRED EMBODIMENTS

Figure 1:
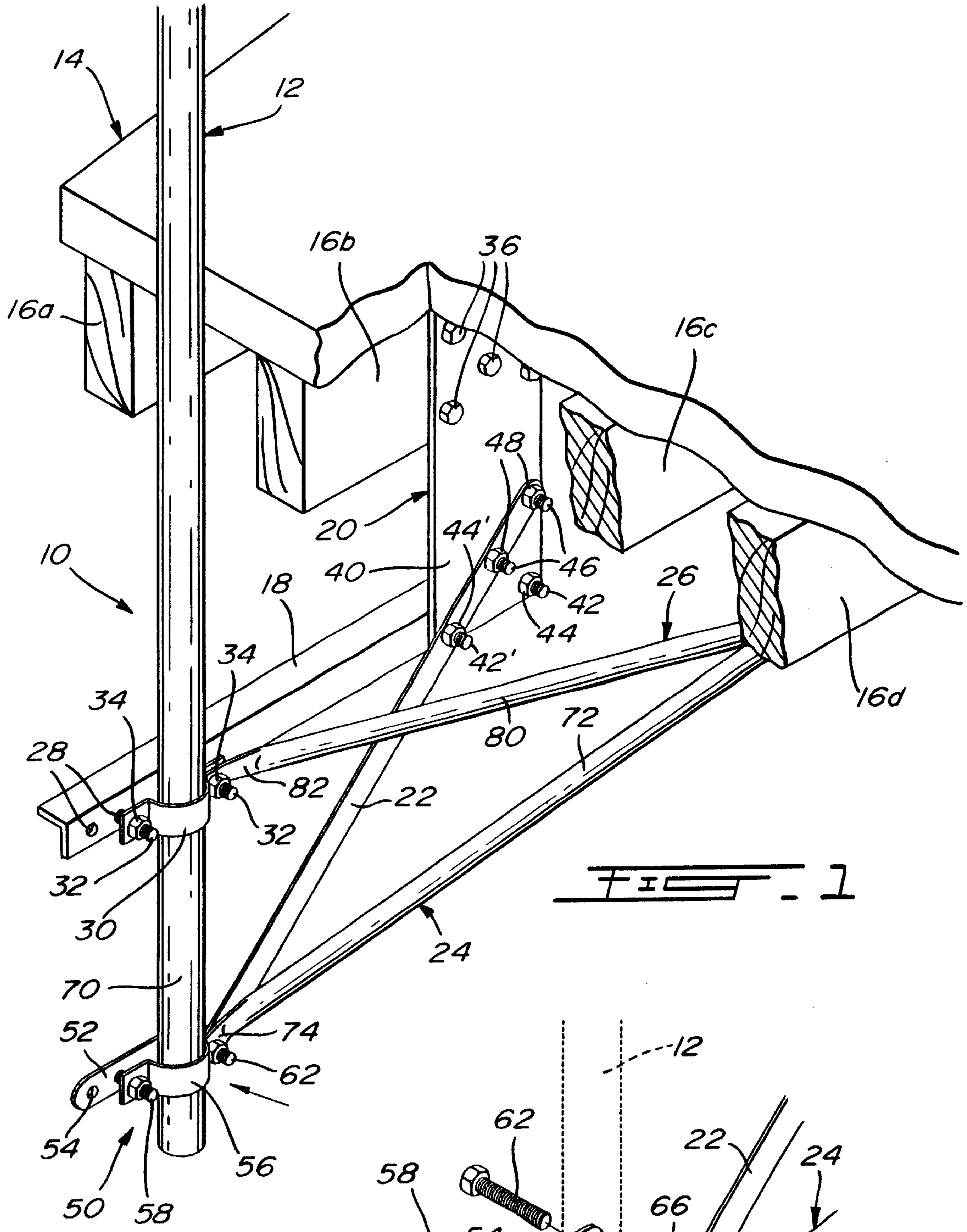
FIG. 1 is a perspective view of an antenna mounting system according to a preferred embodiment of the invention, showing a portion of an antenna mast being held in a vertical position by the antenna mounting system.

The antenna mounting system illustrated in FIG. 1 and generally designated by reference numeral 10 is designed for mounting an antenna mast 12 to the roof 14 of a building having a plurality of exposed rafters 16*a,* 16*b,* 16*c,* 16*d* extending in spaced-apart parallel relationship. The antenna mounting system 10 comprises an elongated support member 18 for holding the mast 12 vertically at a predetermined distance from the edge of the roof 14, and a torsion-resistant attachment plate 20 for attaching the support member 18 to rafter 16*b.* The system 10 further includes three mast stabilizing arms 22, 24 and 26 for maintaining the mast 12 in a stable, generally vertical position so as to resist wind effects. The first stabilizing arm 22 is attached to the rafter 16*b* by means of the attachment plate 20, whereas the second and third stabilizing arms 24 and 26 are attached to rafter 16*d.* The stabilizing arms 22, 24, 26 cooperate with the support member 12 to provide a structurally rigid antenna mounting system.

The support member 18 has a generally L-shaped cross-section for structural rigidity and is provided at its outward end with a plurality of spaced apertures 28 (only two shown). A U-shaped clamp member 30 with bolts 32 and nuts 34 are used for releasably clamping the mast 12 against the support member 18. A clamp member 30 of different size with the bolts 32 extending through selected ones of the apertures 28 can be used to accommodate a mast of varying diameter. The attachment plate 20 is releasably secured to the rafter 16*b* by means of bolts 36 and nuts 38 (shown in FIGS. 3 and 4) so that it is disposed in a vertical plane and has a portion 40 projecting downwardly from the rafter 16*b*. A pair of bolts 42,42' and nuts 44,44' are used for releasably securing the support member 18 at its inward end to the portion 40 of attachment plate 20 so that the support member 18 extends horizontally outward therefrom. As shown, the attachment plate 20 is elongated and defines with the support member 18 a rigid structure having a generally L-shaped configuration.

Figure 2:
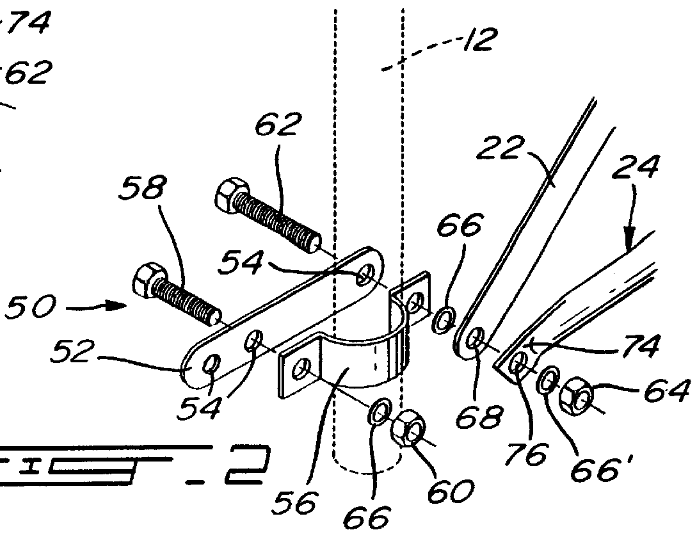
FIG. 2 is an exploded view showing how the two downwardly extending stabilizing arms of the antenna mounting system illustrated in FIG. 1 are secured to the antenna mast, the mast being shown in broken lines.

The first stabilizing arm 22 has a rectangular cross-section and extends downwardly from the attachment member 20 at an angle of about 45° relative to the support member 18. The arm 22 is releasably secured at its upper end to the downwardly projecting portion 40 of attachment plate 20 by means of the bolt 42' and nut 44' as well as bolts 46 and nuts 48. The arm 22 is attached at its lower end to the mast 12 by means a clamp assembly 50 which comprises a planar abutment member 52 provided with a plurality of spaced-apart apertures 54, a U-shaped clamp member 56, a pair of bolts and nuts 58,60 and 62,64, and washers 66, the arm 22 being provided with an aperture 68 for receiving the bolt 62, as best shown in FIG. 2. The apertures 54 serve the same purpose as the apertures 28 defined in the support member 18. The stabilizing arm 22 and support member 18 cooperate with the mast portion 70 extending between the clamp members 30 and 56 to define a rigid structure having a generally triangular configuration and preventing pivotal movement of the mast in a plane parallel to the plane of the attachment member 20.

The second stabilizing arm 24 consists of a tubular member 72 having pliable flat end portions 74 (only one shown), which extends downwardly from the rafter 16*d* and is attached at its lower end to the mast 12 by means of the clamp assembly 50, the flat end portion 74 being provided with an aperture 76 for receiving the bolt 62, as best shown in FIG. 2. A washer 66' is arranged between the bolt 64 and the end portion 74 of the arm 24. The arm 24 is releasably secured at its upper end to the rafter 16*d* by means of a bolt 78 (shown in FIGS. 3 and 4) and a nut (not shown). The third stabilizing arm 26 also consists of a tubular member 80 having pliable flat end portions 82 (only one shown), which extends downwardly from the rafter 16*d* and is attached at its lower end to the mast 12 by means of the clamp member 30, bolt 32 and nut 34. The arm 26 is releasably secured at its upper end to the rafter 16*d* by means of a bolt 80 (shown in FIGS. 3 and 4) and nut (not shown). The stabilizing arms 24 and 26 cooperate with the mast portion 70 to define a rigid structure having a generally triangular configuration and preventing pivotal movement of the mast 12 in a plane transverse to the plane of the attachment plate 20.

Figure 3:
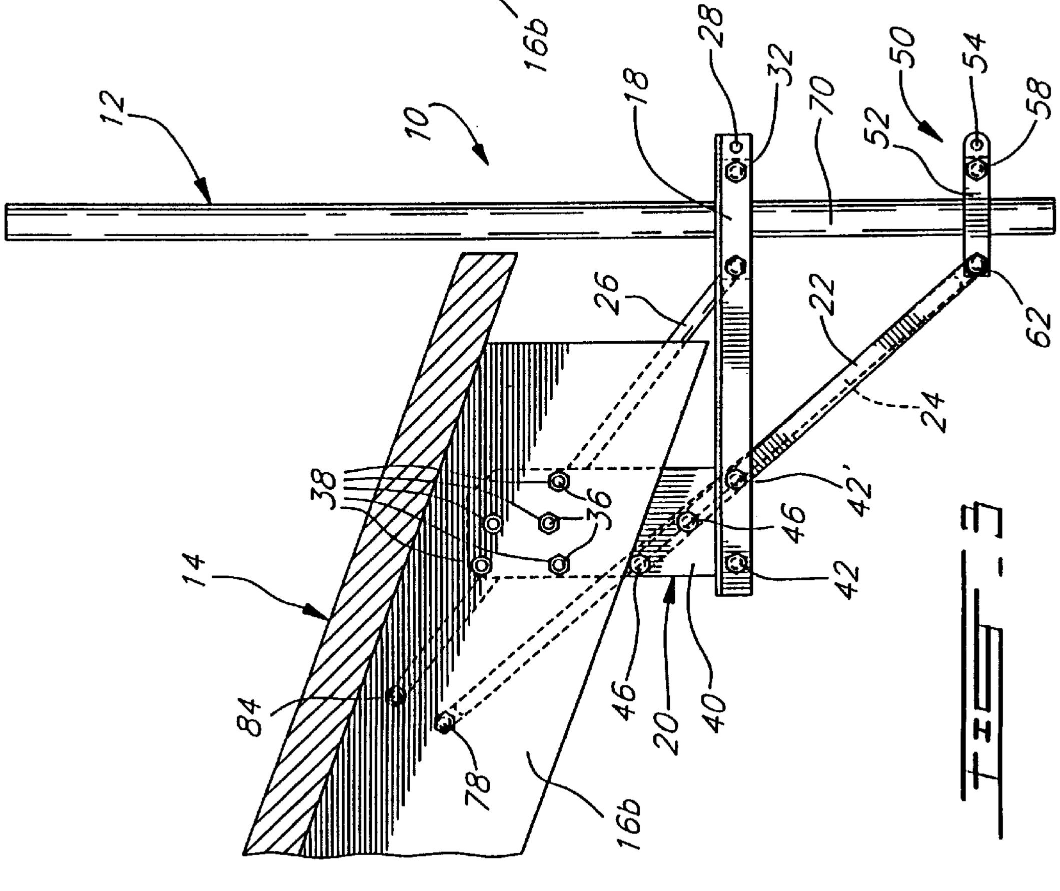
FIG. 3 is a part-sectional side elevation view showing how an antenna mast is mounted with the antenna mounting system to rafters having no facia board.

FIG. 3 illustrates how the antenna mast 12 is mounted with the antenna mounting system 10 to rafters having no facia board. As shown, the support member 18 extends closely adjacent the lower edge of the rafter 16*b*.

Figure 4:
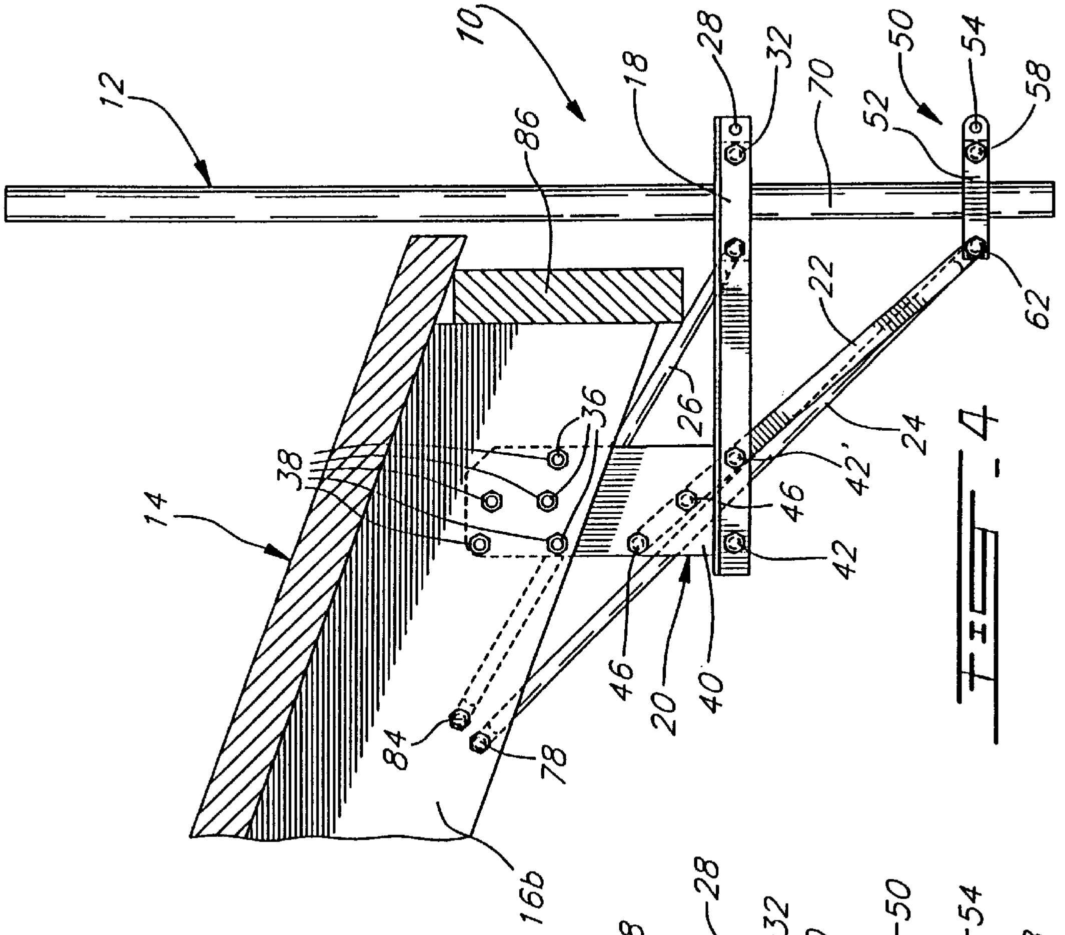
FIG. 4 is a part-sectional side elevation view showing how an antenna mast is mounted with the antenna mounting system to rafters having a facia board.

FIG. 4 illustrates how the antenna mast 12 is mounted with the antenna mounting system 10 to rafters provided with a facia board 86.

I claim:

1. An antenna mounting system for mounting an antenna mast to a building with a roof having a plurality of exposed rafters extending in spaced-apart parallel relationship, said system comprising:

support means for holding said mast vertically at a predetermined distance from an edge of said roof;

torsion resistant attachment means for attaching said support means to one of said rafters, said attachment means including a planar attachment member adapted for attachment to said one rafter so that said attachment member is disposed in a vertical plane and has a portion projecting downwardly from said one rafter with said support means being connected to said downwardly projecting portion; and first and second mast stabilizing means for maintaining said mast in a stable, generally vertical position so as to resist wind effects, said first mast stabilizing means including a first stabilizing arm connected to said downwardly projecting portion of said attachment means so that said stabilizing arm extends downwardly from said attachment member, said second mast stabilizing means being adapted for attachment to an other rafter spaced from said one rafter;

said first and second mast stabilizing means cooperating with said support means to provide a structurally rigid antenna mounting system.

2. An antenna mounting system as claimed in claim 1, wherein said support means comprise an elongated support member having first and second ends with first clamping means at said first end for holding said mast at a first predetermined location thereon.

3. An antenna mounting system as claimed in claim 2, wherein said support member has a generally L-shaped cross-section.

4. An antenna mounting system as claimed in claim 2, wherein said support member is provided at said first end with a plurality of spaced-apart apertures and wherein said first clamping means comprise a U-shaped clamp member and releasable fastening means engaging selected ones of said apertures for releasably clamping said mast against said support member, whereby to accommodate a mast of varying diameter.

5. An antenna mounting system as claimed in claim 2, wherein said attachment means further include first releasable fastening means for releasably securing said attachment member to said one rafter, and second releasable fastening means for releasably securing said support member at said second end to said downwardly projecting portion of said attachment member so that said support member extend horizontally outward therefrom.

6. An antenna mounting system as claimed in claim 5, wherein said attachment member is elongated and defines with said support member a rigid structure having a generally L-shaped configuration.

7. An antenna mounting system as claimed in claim 5, wherein said first stabilizing arm has first and second ends, and wherein said first stabilizing means further include second clamping means at said first end of said first stabilizing arm for holding said mast at a second predetermined location thereon, said second location being sufficiently spaced from said first location to prevent pivotal movement of said mast, and third releasable fastening means for releasably securing said first stabilizing arm at said second end to said downwardly projecting portion of said attachment member so that said first stabilizing arm extends outward from said attachment member at a predetermined angle relative to said support member.

8. An antenna mounting system as claimed in claim 7, wherein said first stabilizing arm has a rectangular cross-section.

9. An antenna mounting system as claimed in claim 7, wherein said second clamping means comprise an abutment member having a plurality of spaced-apart apertures, a U-shaped clamp member and fourth releasable fastening means engaging selected ones of said apertures for releasably connecting said first stabilizing arm at said first end to said clamp member and releasably clamping said mast against said abutment member, whereby to accommodate a mast of varying diameter.

10. An antenna mounting system as claimed in claim 7, wherein said second stabilizing means comprise a second stabilizing arm having first and second ends with said first end being attached to said mast by said second clamping means, and first releasable attachment means for releasably attaching said second stabilizing arm at said second end to said other rafter.

11. An antenna mounting system as claimed in claim 10, wherein said first and second stabilizing arms extend downwardly from said attachment member and said other rafter, respectively.

12. An antenna mounting system as claimed in claim 10, wherein said second stabilizing means further include an additional stabilizing arm having first and second ends with said first end being attached to said mast by said first clamping means, and second releasable attachment means for releasably attaching said additional stabilizing arm at said second end to said other rafter.

13. An antenna mounting system as claimed in claim 12, wherein said second stabilizing arm and said additional stabilizing arm are tubular members with said first and second ends thereof comprising pliable flat end portions.

14. An antenna mounting system as claimed in claim 12, wherein said support member and said first stabilizing arm cooperate with a portion of said mast extending between said first and second locations to define a first rigid structure having a generally triangular configuration, and wherein said second stabilizing arm and said additional stabilizing arm cooperate with said mast portion to define a second rigid structure having a generally triangular configuration.

* * * * *